July 4, 1950 H. O. PETERSON 2,514,162

DIVERSITY RECEPTION

Filed April 25, 1947 2 Sheets-Sheet 1

INVENTOR
HAROLD O. PETERSON
BY H. S. Grover
ATTORNEY

July 4, 1950 H. O. PETERSON 2,514,162

DIVERSITY RECEPTION

Filed April 25, 1947 2 Sheets-Sheet 2

INVENTOR
HAROLD O. PETERSON
BY H. S. Grover
ATTORNEY

Patented July 4, 1950

2,514,162

UNITED STATES PATENT OFFICE 2,514,162

DIVERSITY RECEPTION

Harold O. Peterson, Riverhead, N. Y., assignor to Radio Corporation of America, a corporation of Delaware Application April 25, 1947, Serial No. 743,960

4 Claims. (Cl. 250—8)

Figure 1:
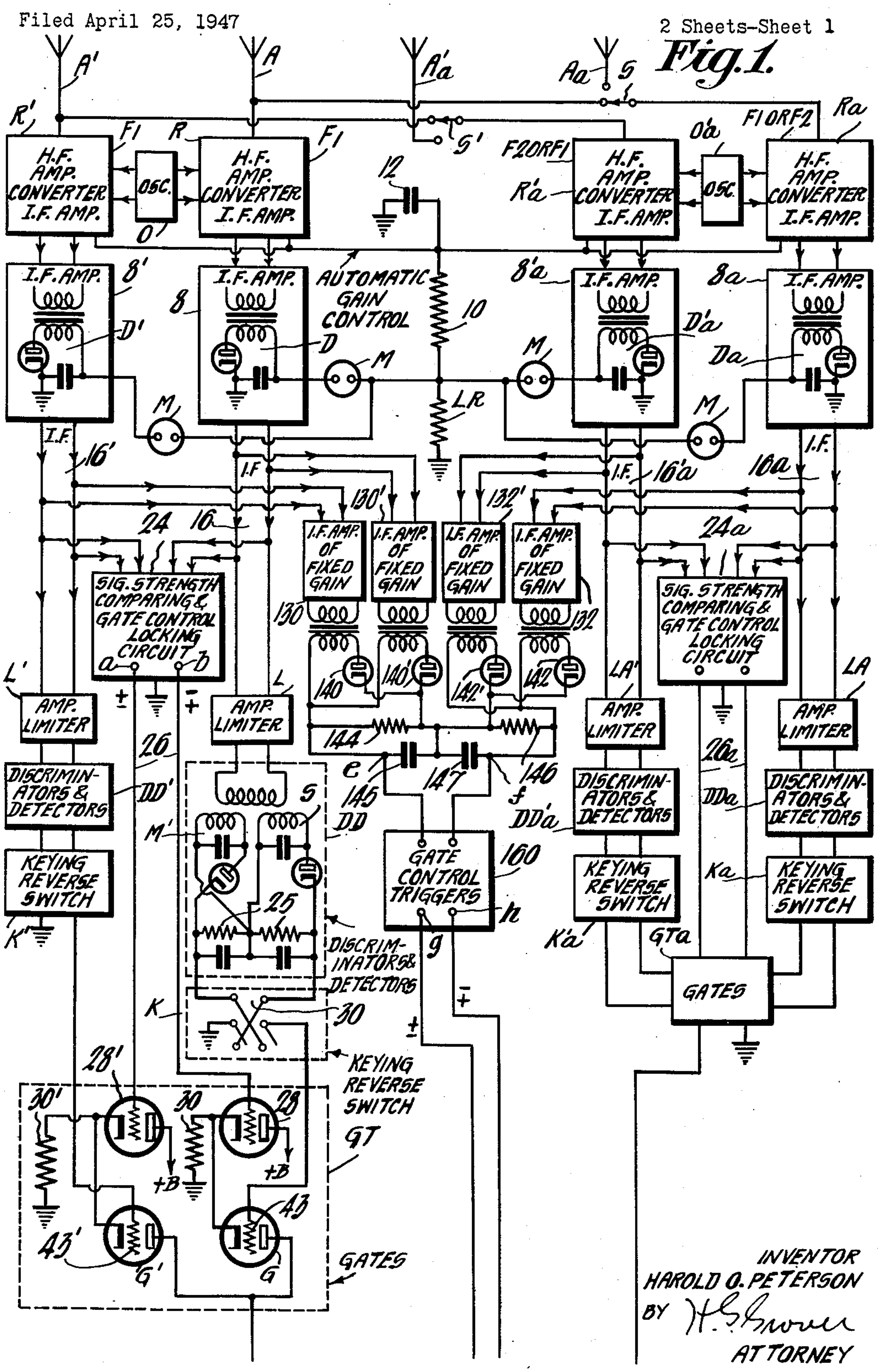

This application relates to diversity receiver systems in general, and in particular to receivers of telegraphy or Teletype signals or facsimile signals or the like. The telegraphy, Teletype or facsimile signal may be of the on-off type or of the frequency shift type, and in explaining and describing my invention reference has been made to systems wherein frequency shift signals are used.

It is well known that fading effects at different points and on antennas of different character at the same point and on waves of different frequency are different, so that when use is made of such diversification better signals may be obtained in the receiver outputs. In Schock et al. application #632,978, filed December 5, 1945, is shown a two-set space diversity system with fast acting channel selecting means. The receivers in this system operate at the safe frequency. This system is very satisfactory in operation.

It has been found that different frequencies give best results during different periods of the day. These frequencies, one of which (usually the higher) is most effective in the day time, the other of which is most effective in the night time, are too widely separated in the frequency spectrum to be handled in a single receiver without retuning the same each time the frequency of operation is changed. Moreover, during the transition period, the two frequencies are alternatively most effective and reception of the best signal becomes difficult. This necessitates the use of two complete diversity systems, one for day time use at one frequency, and the other for night time use at the other frequency.

This improves reception but still difficulty is encountered during the transition period from day time to night time and vice versa. Then, the operator has to select the time to switch over and can do so only by observing the recorded signal on each system and deciding which signal is best. In some installations, the signal is re-transmitted and then the operator cannot observe the same, but must rely on his judgment as to the time when the changeover from night frequency to day frequency or vice versa must be made. Even then the results are not good because fading effects are random with respect to space, time and frequency and during the transition time, one frequency and then the other momentarily gives the best results.

The primary object of my invention is improved diversity reception.

More specifically, the object of my invention is provision of a diversity system wherein diversification between channels on the same frequency and between groups of channels on different frequencies is provided. This takes the burden of estimating when the changeover is to be made out of the operator's hands and supplies the best signal from that frequency band giving the best results at all times.

Briefly, these objects are attained by provision of two diversity sets (wholly or partly separate) operating at different frequencies, one for, say, day time use and the other for, say, night time use. Each diversity set includes at least two receivers in space or antenna polarization diversity or both, and output from that receiver having the best signal is selected in each case by a selector system quite like that disclosed in the application referred to above. A third signal gating means is provided to which the selected receiver output from each of the two sets is fed and this gating means is controlled by potentials developed by comparing the sum of the outputs from the receivers of one set at one frequency with the sum of the outputs of the receivers of the other set at the other frequency. Thereby, I select at all times the frequency at which fading is least and the signals are best and further, I select output from that receiver getting the best signal on the said selected best frequency. After the transition period is definitely passed, the operator may turn off one set or part thereof.

In describing my invention in detail, reference will be made to the drawings, wherein Figs. 1 and 1*a* together illustrate one embodiment of a space and frequency diversity system arranged in accordance with my invention.

In the drawings, A and A' represent antenna systems for intercepting radiant energy waves.. The antenna systems are either in space or polarization diversity or both and supply current representing the radiant energy waves to radio receivers R and R' of one diversity set operating at frequency F1 and also supply current or voltages to the two receivers R*a* and R*a'* of a second diversity set operating at a different frequency F2. The receivers all have a common gain control circuit including a load resistor LR common to the outputs of diode detectors D, D' of the one set and D*a* and D*a'* of the other set. Meters M may be included in the connections between the individual diodes and the common load resistor LR for tuning and adjustment purposes. The potential drop developed across the resistor LR is supplied by resistor 10 to an automatic gain control circuit going back to all of the receivers. A condenser 12 sets the time constant or quickness of response of the automatic gain control as desired.

The receivers R and R′, R$a$ and R$a'$ each may include high frequency amplifiers, a converter and if desired, intermediate frequency amplifier. The automatic gain control circuits may lead to gain control tube elements in the high frequency stages or I. F. stages or both. An oscillator 0 is used to supply oscillatory energy to the converters in R and R′, although if desired separate oscillators for each receiver may be supplied. An oscillator 0$a'$ is supplied and serves a similar purpose for receivers R$a$ andR$a'$. The I. F. amplifiers in the units 8, 8′, 8$a$ and 8$a'$ include the necessary amplifier stages with coupling circuits to pass the frequency shifted currents which may, for example, be 50 kc. plus several hundred cycles for "mark" and 50 kc. minus the same several hundred cycles for "space."

The intermediate frequency outputs from the receivers are supplied to the avc diodes D, D′, D$a$ and D$a'$ and also by leads 16, 16′, and 16$a$ and 16$a'$ to the frequency and space diversity selector systems which will now be described. For the sake of simplicity, in this description, one channel only of the space or polarized diversity system will be described in detail. The other channel is similar and the said one description will apply thereto in like manner. The intermediate frequency output from leads 16 goes to a current amplitude limiter L and also to the signal strength comparing detectors in 24 for controlling the locking circuit also in unit 24. The intermediate frequency energy from leads 16′ goes to a similar current amplitude limiter L′ and to the signal strength comparing detectors and control for the locking circuit also in unit 24.

In this unit 24, I compare the relative strengths of the signals of intermediate frequency derived at the outputs of receivers R and R′ to provide differential control potentials appearing across or on leads 26, which potentials are fed to control triodes 28 and 28′ which control the gate tubes G and G′. The signal strength detectors, locking circuit control tubes and locking circuits of unit 24 function in a more or less conventional manner to provide differential control potentials on leads 26 connected to points $a$ and $b$ in the output of the last locking tube stage in unit 24.

These control potentials at points $a$ and $b$ show which receiver R or R′ is getting the best signal, and the said differential control potentials are fed to the control grids of tubes 28 and 28′. The tubes 28 and G and 28′ and G′ may be in separate or common envelopes. In the latter case, the cathodes are common and are connected to ground by cathode biasing resistors 30 and 30′ so that the potential drops in these resistors appear on the cathodes of the gating tubes G and G′. When the potential at $a$ is sufficiently positive, the heavy current in resistor 30′ will make the cathode of tube G′ positive enough to keep this tube at cut off. Then a negative potential is at $b$ and the tube 28 is non-conductive to reduce the current in resistor 30, making the cathode of tube G less positive and letting tube G pass current.

The control grids 43 and 43′ of the gate devices are coupled by keying reverse switches K and K′ to the outputs of the discriminator and detector circuits in units DD and DD′. These discriminator and detector circuits each include two diodes and two tuned circuits designated M′ and S respectively, with diode load resistors 25. The circuit designated M′ is tuned above the marking frequency while the circuit designated S is tuned below the spacing frequency and the outputs are opposed, so that across the terminals 30 of the switch K appears a potential which varies above and below zero potential depending on whether mark or space signal is applied to the detector. In other words, the potentials here vary in magnitude between two values, one representing mark, one representing space. The operation of the detectors is substantially as disclosed in the aforementioned application and will not be described in detail here. The purpose of the switches K and K′ is to permit reversal of the keying so that in the recording apparatus the marking characteristics may be coordinated with the marking characteristics at the transmitter, if for some reason they have become reversed. One reason could be mistuning of the oscillator O with respect to the frequency F1.

The two versions of the signal are applied to the grids 43 and 43′ of the gate tubes. The potentials at the output of the signal strength sensing circuit in unit 24 operate on locking circuits therein, not shown, to provide across the terminals $a$ and $b$ potentials which vary from plus to minus depending on which channel has the strongest signal and trips the locking circuit in a selected position. These potentials which vary from plus to minus are applied to the control grids of tubes 28 and 28′ so that one or the other thereof has its negative bias reduced so that it draws current while the remaining tube is cut off. Assume, for example, that the control grid of tube 28′ becomes positive to increase the potential drop across resistor 30′ to make the cathode of tube G′ more positive. This is the same as making the control grid 43′ of this tube less positive or more negative and this tube is cut off. At the same time, the potential on the control grid of tube 28 becomes less positive or negative to cut off current in this tube to let the potential at the cathode end of resistor 30 fall and make the cathode of tube G less negative. This is the equivalent of making the control grid 43 thereof more positive or less negative so that current is now passed by this tube, which amplifies the output of the receiver R connected by I. F. line 16 to the limiter L and detector DD.

Figure 1A:
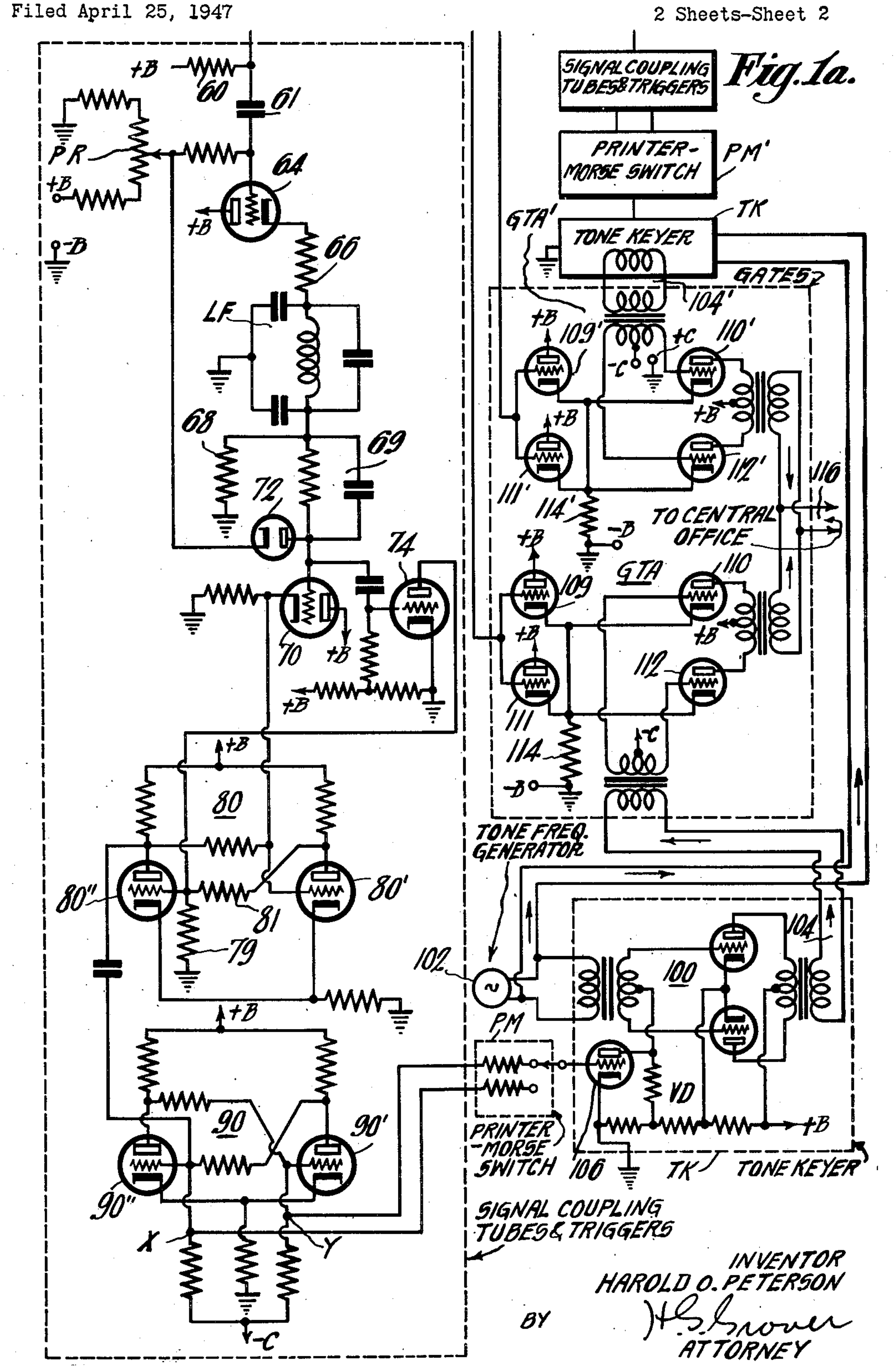

The output of this receiver is then supplied by way of gate tube G to the common load resistor 60, Fig. 1$a$ connected at the output of the tubes G and G′. The varying potentials representing the signals appear across load 60 and are fed by large coupling condenser 61 to the control grid of an amplifier and coupling tube 64. The tube 64 has its cathode coupled by a resistor 66 and a low pass filter LF to a load resistor 68. The load resistor 68 is coupled by a condenser and resistor unit 69, wherein the resistance is of high value, to the control grid of a tube 70. A diode 72 has its anode connected between the high resistance and grid of tube 70 and its cathode connected to the movable point on the potentiometer resistor PR across a direct current source. This point on the potentiometer is also coupled to the control grid of tube 64.

The potentials across resistor 60, which represent the signal, are fed to the coupling tube 64 and the cathode of this tube swings in phase with the applied potential. Ripples on the signals are filtered off by the filter LF and the potential varying at signal frequency is developed across resistor 68 and fed to the grid of tube 70, which drives a locking circuit 80. The purpose of the tube 72 is to limit the positive swings or excursions of the signal. The anode of this tube runs positive in operation, since it is tied to the cathode of tube 64, and to get the desired clamping or limiting action, the cathode of tube 72 is made positive by moving the position of the movable point on the potentiometer PR as desired. If the positive swings exceed a set value, that is, are such that the anode of the clamping tube becomes more positive than the cathode, the current flows through the high resistor 69 to develop therein a potential drop which limits the positive excursions of the signal voltage.

The signal voltage is repeated in the cathode follower stage 70 and applied to a control grid of a circuit 80 having two tubes in a locking or triggering circuit. In these locking circuits, when current is initiated in one tube, it builds up therein and by virtue of the cross couplings between the anodes and grids, is cut off in the other tube. The circuit stays in this condition until some external excitation voltage changes the same. For example, tripping action is started by an increase in negative potential on the control grid of the tube passing current.

The tube 74 is a "mark" restoring tube and operates as disclosed in Atwood U. S. application Serial #618,760 filed September 26, 1945, Patent No. 2,511,093, issued June 13, 1950, to restore the locking circuit 80 to the mark condition in the event it is tripped therefrom for a period of time greater than the intervals between signal elements. Obviously, in operation it is desired to end the recording operation or printer operation on the same signal character at all times, say, for example, on "mark" when a printer is used. The recording starts on the same character, in the example given on "space." A burst of static might come in between messages or during a long space in messages to trip the equipment from mark to space. The tube 74 is a means for restoring the equipment to mark condition when it is improperly tripped therefrom. The tube 74 and its connections are as disclosed and claimed in Atwood U. S. application, Serial #618,760 filed September 26, 1945. No detailed description thereof will be given here. However, the connections are such that the following operation is carried out. The grid of tube 74 is also excited by the signals and this grid runs a little positive by virtue of its connection to the voltage divider across the direct current plate source to which its grid is connected. When no signals are coming in, the tube 74 plate-to-cathode impedance is low and shunts the resistor 79 in the grid circuit of locking tube 80''. On "mark" the potential at the grid and cathode of tube 64 and on the grid of tube 70 and on the cathode of tube 70 rises to trip current through tube 80'. The first space character lowers the potential across resistor 68 and on the cathode of tube 70 and on the control grid of tube 80' and biases tube 74 to cut off. The potential on the anode of tube 74 and on the grid of tube 80'' rises. This double action trips the current through tube 80'' and biases tube 80' to cut off on space. When mark characters follow, being of positive polarity across resistor 68 they are partially rectified on the grid of tube 74 to make tube 74 partially conductive to draw current through resistor 81 and to lower the potential on the grid of tube 80'' to let the circuit trip to the mark condition with current in tube 80' and current cut off in tube 80''. When keying stops, the negative charge on the grid of tube 74 leaks off, leaving this tube conductive to draw heavy current through resistor 81 and to lower the potential on the grid of tube 80'' and trip the system to the mark position with tube 80' conducting and tube 80'' non-conductive. This restoring action takes place as often as static bursts trip the locking circuit to the space condition, because the negative potential built up on the grid of tube 74 soon leaks off to re-establish the mark condition. The time constant of the circuits are such that restoration to mark condition is too slow to take place during signalling.

The variations at signal frequency of the potentials at the anode of tube 80'' are fed to a second locking circuit 90 which needs no detailed description, being substantially similar to the locking circuit at 80. Since tube 80'' is non-conductive in mark position, its anode potential is then up and the grid of tube 90'' up so that this tube 90'' is conductive on mark while tube 90' is non-conductive.

The potentials at the points X and Y vary differentially, being up at X and down at Y on mark.

A selected one of these differentially varying potentials is derived by a switch PM and fed to a tone keyer TK. Switch PM is switched to position Y as shown, for the operation of printer circuits. Under this condition, tube 74 will function to cause steady "mark" in the tone keyer output during idle periods. For Morse operation, switch PM is thrown to position X and switches K and K' are reversed. Under this condition tube 74 will function to cause steady "space" in the tone keyer output during idle periods.

The tone keyer TK is substantially as described in my U. S. application 675,348 filed June 8, 1946, which has now ripened into Patent #2,457,268 dated Dec. 28, 1948, and will not be described in detail herein. This tone keyer, however, comprises a stage 100 including a pair of tubes with their control grids and anodes differentially coupled respectively to a tone source 102 and to output lines 104. The control grids of stage 100 are connected to the anode of a keyer tube 106 which anode is connected by a load resistor to a voltage divider VD, the arrangement being such that the tubes of stage 100 are cut off or non-conductive when the tube 106 is conductive. The oscillations of tone frequency from the source 102 as keyed are repeated in the stage 100 and supplied as output on lines 104. When the tube 106 is non-conductive, its anode potential goes up to make the grids of the tubes of the stage 100 conductive to let this stage amplify tone from source 102 and supply it to the leads 104. In the switch positions shown, the potential at Y is down in the "mark" condition, thereby biasing tube 106 to cut off to make the tubes of stage 100 conductive to send out a pulse of tone energy on lines 104 in the "mark" condition.

By the means thus far described, the best signal is derived from the receivers R and R' operating at frequency F1 and is used to develop keyed tone fed by lines 104 to the grids of the second triode sections of tubes 110 and 112 of gate GTA. At the same time, the best signal is derived from the receivers Ra and Ra' operating at a frequency F2 and is used to develop keyed tone fed by lines 104' to the grid of the second triode sections 110' and 112' of the gate tube GTA'. These tubes 110 and 112 and 110' and 112' are alternatively conductive, one set thereof being turned on at one time so that only that keyed tone representing the best of the two signals is selected from the two pairs of receivers and fed to the main output lines 116 for use. The means for selecting which frequency F1 or F2 is giving the best results and opening the appropriate gate GTA or GTA' will now be described.

I. F. currents shifted in frequency by the signals are supplied from lines 16, 16', 16a and 16a' respectively to I. F. amplifiers 130, 130', 132 and 132'. The amplifiers are of fixed gain and of pass band broad enough to pass the I. F. carriers and their side bands uniformly. Each amplifier feeds a diode rectifier. The rectifiers are designated 140, 140', 142 and 142'. The diode load resistor 144 is arranged in parallel with respect to the electrodes of the diodes 140 and 140' to combine additively the potential drops produced in the said load by rectification of I. F. currents representing energy of the frequency F1. Load resistor 146 is similarly connected with respect to the electrodes in diodes 142 and 142' to combine additively the potentials resulting from rectification of the I. F. currents representing energy of frequency F2. The potentials developed in resistors 144 and 146, however, oppose so that if the I. F. carrier strengths at both frequencies are equal the potential between *e* and *f* is about zero. If the received wave of frequency F1 comes in the best, then the I. F. supplied by amplifiers 130—130' will be best and the potential at *e* becomes negative relative to the potential at *f*. If the high frequency carrier F2 is best, then the potential at *f* will become negative relative to the potential at *e*. Filter condensers 145 and 147 are connected in shunt to the load resistors to delay or slow up the potential variations as desired.

The potential variations at *e* and *f* are fed to a control tube, not shown, in unit 160, to control a cascaded stage locking circuit therein, not shown, to produce at output terminals *g* and *h* differentially changing control potentials for the tube gates GTA and GTA'. The apparatus of unit 160 may be like the corresponding circuits described above in connection with unit 24. The gating tube arrangement GTA includes triode sections 109 and 111 which may be single tubes or may be included in the same envelopes with triode sections 110 and 112, respectively. All of these tubes have their cathodes tied together and connected to ground by a common biasing resistor 114, so that if current flows in resistor 114 all of the cathodes are made more positive with respect to ground. Making the cathodes of triodes 110 and 112 positive with respect to ground is the same as making their control grids more negative. Adjustment is such that when tubes 109 and 111 are conductive tubes 110 and 112 are biased to cut off. If necessary, additional bias may be supplied by connecting a source of negative potential to the terminals labeled —C. The gating arrangement GTA' is similarly connected and operated and includes additional triode sections 109' and 111'.

The locking tube arrangement in unit 160 is such that the potential at *h* is negative when fading is least harmful on the frequency F2. Then the gating control devices 109' and 111' are biased to cut off by this negative potential so that these tubes do not draw current. The potentials at the cathodes thereof are less negative because of the reduction of potential drop in the resistor 114'. The same potential is applied to the cathodes of the tubes 110' and 112', so that these cathodes become less positive. This is the same as making the grids less negative and the potentials are such that the tubes 110' and 112' now become conductive to let through this side of the gating system keyed tone controlled by the wave coming in at frequency F2. Note that this wave has also been selected and is the best of the two waves received at frequency F2. At the same time the potential at *g* is positive to make control devices 109 and 111 conductive to increase the potentials on the cathodes of tubes 110 and 112 to drive these tubes to cut off, so that keyed tone derived by use of output from the receiver operating at frequency F1 having the best signal is blocked off from the output lines 116. If fading effects on F1 are reduced and at F2 increased, the potentials at *e* and *f* will change to trip the locking circuit in 160 to make the potential at *g* minus to open up the gate devices 110 and 112 and make the potential at *h* positive to close the gate devices 110' and 112'. The signal derived by use of received energy at the frequency F1 will be fed to the lines 116.

It should be noted that if receivers R*a* and R*a'* are connected to two independently spaced antennas instead of being connected to the same pair of antennas (A and A') as receivers R and R', we then have a means for receiving with four set diversity, by simply tuning all four receivers to receive the same frequency. To carry out the operation, switches S and S' are moved to connect antennas A'*a* and A*a* to receivers R'*a* and R*a* respectively and all receivers are tuned to operate on the same frequency.

What is claimed is:

1. In a diversity system, in combination, antennas having different pick-up characteristics and operating at different frequencies, a pair of receivers operating at a first frequency coupled to said antennas, a pair of receivers operating at a second frequency coupled to said antennas, a signal strength comparing detector for comparing the strengths of the signals in the receivers of one pair of receivers to select output from that receiver of said one pair getting the strongest signal, a second signal strength comparing detector for comparing the strengths of the signals in the receivers of the other pair of receivers to select output from that receiver of said other pair getting the strongest signal, and additional signal strength sensing detectors for comparing the total strength of the signals in one pair of receivers with the total strength of the signals in the other pair of receivers for selecting output from the selected receiver of that pair having the strongest total output.

2. A diversity system comprising, in combination, at least two receivers operating at a first frequency, means for comparing the signals therein to select output from that receiver having the best signal, means for generating oscillatory energy, means for keying said energy in accordance with said output, at least two other receivers operating at a different frequency, means for comparing the strengths of the wave energies in said last pair of receivers and for selecting output from the receiver having the best signal, means for keying said oscillatory energy in accordance with the output of said last named selected receiver, a gating stage having two input channels each excited by one of said keyed energies, said channels being selectively operable to pass the energy thereof in response to a control potential, means for comparing differentially the total output from said first pair of receivers with the total output from said second pair of receivers to derive a control potential, and means for controlling said gating stage in accordance with the control potential.

3. In a diversity system, a first pair of radiant energy receivers, a second pair of radiant energy receivers, a gate device coupled to each receiver, signal strength sensing detectors coupled to the receivers of each pair for comparing the signals in the receivers of the pairs and for deriving a potential for making conductive that one of the gate devices for each pair of receivers coupled to the receiver getting the strongest signal, a final gate device for each pair of said first named gate devices, each of said final gate devices being excited by electrical energy representing the energy passed by a different pair of said first named gate devices, signal strength detectors for comparing the total signals in one pair of receivers with the total signals in the other pair of receivers and for applying control potentials to said final gate devices to make them selectively conductive one at a time, and a common output circuit coupled to said final gate devices.

4. In a deversity system, in combination, at least two pairs of antennas each of which antennas has different radiant energy response characteristics, at least two pairs of receivers with the respective receivers of each pair coupled to the respective antennas of a different pair of antennas, signal strength detectors for comparing the signals of the receivers of one pair to select output from that receiver having the best signal, a source of oscillatory energy, a control device actuated by said output for keying said source in accordance with said output, other signal strength detectors for comparing the strengths of the wave energies in the receivers of the other pair to select output from that receiver of said other pair having the strongest signal, a second control device actuated by said last output for keying said source in accordance with the last named selected output, a gating stage having two input channels each excited by one of said keyed energies, said channels being selectively operable to pass the energy thereof in response to a control potential, additional signal strength detectors for comparing the total output from said first pair of receivers with the total output from said second pair of receivers to derive a control potential, and means for controlling said gating stage in accordance with the derived control potential.

HAROLD O. PETERSON.

REFERENCES CITED

The following references are of record in the file of this patent:

UNITED STATES PATENTS

| Number | Name | Date |
|---|---|---|
| 2,028,860 | Beverage | Jan. 28, 1936 |
| 2,089,568 | Moore | Aug. 10, 1937 |
| 2,210,089 | Loughren | Aug. 6, 1940 |
| 2,253,867 | Peterson | Aug. 26, 1941 |
| 2,383,126 | Hollingsworth | Aug. 21, 1945 |
| 2,384,456 | Davey | Sept. 11, 1945 |
| 2,447,057 | Crosley | Aug. 17, 1948 |